United States Patent [19]
Fraize et al.

[11] Patent Number: 4,802,724
[45] Date of Patent: Feb. 7, 1989

[54] RESERVE DEVICE FOR OPTICAL FIBERS

[75] Inventors: Claude R. Fraize, Bondoufle; Christian Forja, Wissous; Robert Calevo, L'Hay les Roses, all of France

[73] Assignees: Societe Anonyme de Telecommunications; Societe Industrielle de Liaisons Electriques, Paris, France

[21] Appl. No.: 74,304

[22] Filed: Jul. 15, 1987

[30] Foreign Application Priority Data
   Jul. 15, 1986 [FR] France .................................. 86 10270

[51] Int. Cl.⁴ ............................................. G02B 6/36
[52] U.S. Cl. ................................................ 350/96.20
[58] Field of Search ............................ 350/96.20, 96.21

[56] References Cited
U.S. PATENT DOCUMENTS

| | | |
|---|---|---|
| 4,171,867 | 10/1979 | Cocito .............................. 350/96.21 |
| 4,610,503 | 9/1986 | Miyazaki et al. ................. 350/96.20 |
| 4,619,499 | 10/1986 | Gerber ............................. 350/96.20 |

FOREIGN PATENT DOCUMENTS

| | | |
|---|---|---|
| 0144511 | 9/1982 | Japan ................................. 350/96.20 |
| 0049907 | 3/1983 | Japan ................................. 350/96.20 |

Primary Examiner—James W. Davie
Attorney, Agent, or Firm—Lowe, Price, LeBlanc, Becker & Shur

[57] ABSTRACT

A reserve device is provided for optical fibers, including a flat bottomed case with a core defining a recess having substantially the form of a closed loop omega, at the ends of which inlet and outlet channels are provided for the optical fibers, each fiber being protected by two tubular ducts leaving it bare, coiled about said core, said tubular ducts being immobilized in the inlet and outlet channels when the case is closed, said core including a central part integral with the case, surrounded by a removable ring intended to be removed after coiling of the optical fibers.

6 Claims, 1 Drawing Sheet

RESERVE DEVICE FOR OPTICAL FIBERS

BACKGROUND OF THE INVENTION

1. Field of the Invention

The present invention relates to a reserve device for optical fibers, each optical fiber being protected by at least one tubular duct, said device being formed of a case having a flat bottom and a lid, said bottom being provided with a core defining a recess having substantially the form of a closed loop omega, at the ends of which are provided an inlet channel and an outlet channel for the optical fibers.

The present invention relates then to cases for storing optical fibers and more particularly to cassettes intended to receive bundles of optical fibers at their exit from optical cables, so as to protect the fibers and to provide reserve lengths in the path of the bundle.

The purpose of these cassettes is essentially to provide an optical fiber reserve at the ends of the optical fibers, while providing mechanical protection, so as to protect the fibers and not to affect their transmission characteristics and their lifespan while respecting their minimum radius of curvature.

These cassettes find their application in optical fiber telecommunications lines, in teledistribution video communication networks for example.

2. Description of the Prior Art

From the French application No. 2 566 756 a reserve device of the above type is already known. In this device, each of the optical fibers being disposed in one tubular protection duct, it is coiled, around the core, provided with its protection duct.

From the article "Optical Fiber Patchcord Tensile Protector" in Research Disclosure No. 186, October 1979, pages 555–556, No. 18 637, Industrial Opportunities limited, Havant, Hants. G. B. a device is known of a closely related type in which one protection duct is provided of a diameter substantially wider than the diameter of the fiber, this latter being coiled while remaining provided with its protection duct.

From the French patent No. 2 573 877, in the name of the applicant, a device of a closely related type is also known in which the fibers are stored in flexible tubular ducts, each tubular duct being a thick ribbon preventing overlapping of the turns.

Now, these prior art devices are not satisfactory under conditions where high temperature variations occur. In fact, since the tubular ducts are generally made from a synthetic material, they do not have the same coefficient of elasticity, during temperature variations, as the optical fibers, which generally leads to breakages or voltages harmful for the optical fibers.

The invention proposes overcoming these defects of the prior art cassettes.

SUMMARY OF THE INVENTION

For this, it provides a device of the above defined type, in which each optical fiber is protected by at least two tubular ducts leaving it bare, coiled about said core, said tubular ducts being disposed in said inlet channel and in said outlet channel, respectively, which are adapted so as to immobilize said tubular ducts when said lid closes the reserve device.

In a first embodiment, at least one of the inlet and outlet channels has a rectangular section so as to receive said tubular ducts aligned side by side.

In a second embodiment, at least one of said inlet and outlet channels has a semicircular section, a corresponding channel having the same semicircular section is formed in said lid and a barrel is provided formed with grooves in which said tubular ducts are disposed, said barrel being disposed in said two semicircular section channels.

Advantageously, said core includes a substantially cylindrical central part integral with said case, surrounded by a removable ring intended to be removed after coiling of the optical fibers.

BRIEF DESCRIPTION OF THE DRAWINGS

Other advantages and features will be clear from reading the following description illustrated by the drawings, in which.

DESCRIPTION OF THE PREFERRED EMBODIMENTS

Figure 1:
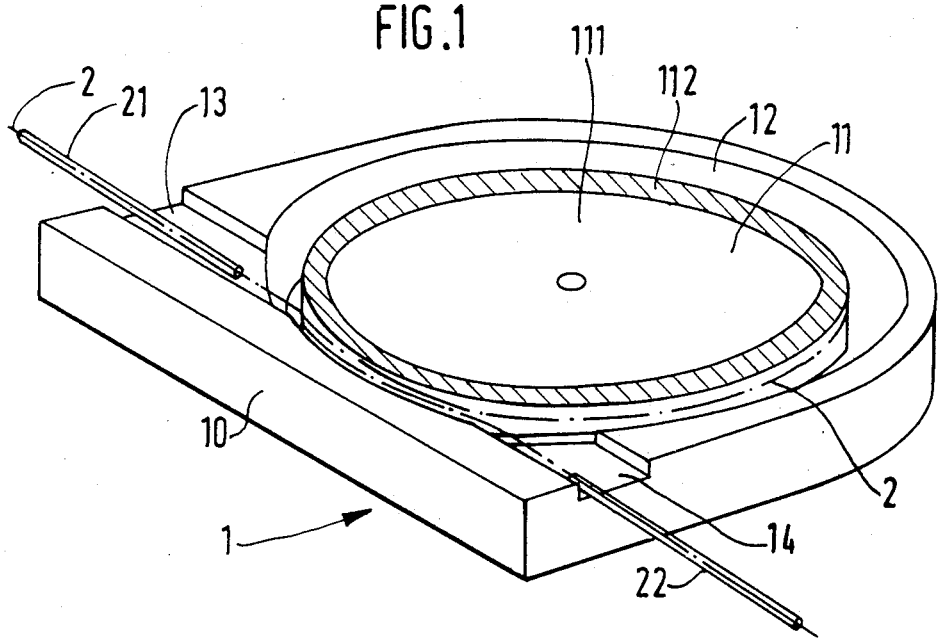
FIG. 1 is a perspective view of the case of the device of the invention, before fitting of the lid.

Referring to FIG. 1, the cassette 1 of the invention is essentially formed of a flat bottomed case 10 having a core 11 defining a recess 12 having substantially the form of an omega whose loop is closed.

Inside this omega, core 11 is substantially cylindrical and the optical fibers may be coiled thereabout by following the path of recess 12.

Figure 2:
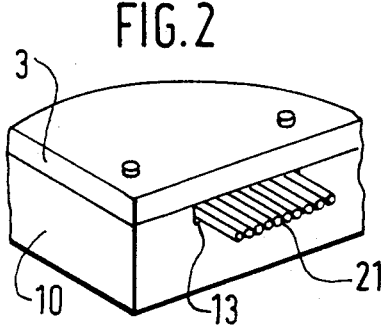
FIG. 2 shows a first method of inserting the tubular ducts at the output of the cassette.

This core 11 includes a central part 111 integral with case 10 and a ring 112, surrounding part 111, which is removable as will be explained hereafter. At each end of this omega 12 are provided two channels 13 and 14 respectively for the inlet and outlet of the optical fibers. Each channel may either have a rectangular section 13 if it is a question of a flat cable structure as shown in FIG. 2, or a semicircular structure 43 if it is a question of cables with substantially cylindrical structure as shown in FIG. 3.

A lid, not shown in FIG. 1, may, in a way know per se, close this reserve cassette by being screwed for example on case 10.

It is known that when the optical fibers 2 are drawn out from the optical cable they are fitted into flexible tubular ducts 21, 22 for their protection. In accordance with the invention each fiber 2 is protected by means of at least two tubular ducts 21, 22 so as to leave the bare fiber 2 in the reserve cassette 1. The ends of the tubular ducts 21, 22 are disposed in the channels 13 and 14 respectively of cassette 1. In FIG. 1 a single optical fiber 2 has been shown for simplifying the drawing but it it obvious that cassette 1 could receive 8, 10 or more fibers drawn out from an optical cable by aligning the 8 or 10 ends of the tubular ducts in channel 13, (respectively 43) of cassette 1, as shown in FIG. 2 (respectively 3). In the version shown in FIG. 2, the tubular ducts 21 are aligned in channel 13 then held in position and immobilized when lid 3 is fitted or screwed for closing cassette 1.

Figure 3:
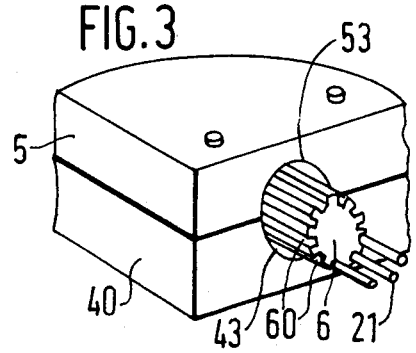
FIG. 3 is a variant of FIG. 2.

In the variation shown in FIG. 3, the case 40 of the cassette has a semicircular section channel 43, whereas in the lid 5 a corresponding channel 53 is also provided having the same semicircular section. In this latter variant, the ends of the tubular ducts 21 are disposed in the grooves 60 of a barrel 6. These grooves 60 are disposed on the periphery of this barrel 6 and longitudinally so that, when lid 5 is fitted on bottom 40 for closing cassette 1, the tubular ducts 21 are immobilized in grooves 60 of this barrel 6.

In the two embodiments, the closure of lid 3 (respectively 5) on case 10 (respectively 40) even causes a slight crushing of the tubular ducts 21 while leaving the fibers free which they contain. This allows the tubular ducts 21 to be immobilized in cassette 1.

Fiber 2 is then coiled in the cassette, bare without tubular duct, about core 11 and more precisely about ring 112. After all the fibers 2 have been coiled, ring 112 is removed, in accordance with the invention, which allows a great freedom for the fibers in the cassette, the fibers being in an intermediate position between the external and internal walls of recess 12 formed in the bottom of the cassette.

Immobilization of the tubular ducts 21, 22 by means of lid 3 or 5 further provides sealing for the cassette and protects fibers 2 from humidity. It may moreover be advantageous to provide holes in the lid opposite the path of the bared fibers 2 so as to introduce a gel protecting the fibers 2 from humidity.

Such construction and the method of putting it into practice give every satisfaction to a technicien in avoiding any tractive force on the fibers.

Of course the lid may be either a simple closure plate 3 or a structure 5 identical to the above described cases.

Instead of providing two tubular ducts per fiber at most, it is also possible to provide only one and to cut it on the site at the appropriate position for storing the bare fiber in the cassette. In FIG. 1, fiber 2 is shown with a discontinuous line. Naturally, this line may be representative of a single fiber or of a bundle of several fibers.

What is claimed is:

1. Apparatus for protectively containing a reserve length of at least one optical fiber disposed within two protective tubular ducts, comprising:
    a base element having a flat bottom and an internal substantially annular recess formed around a circular central core having a predetermined diameter, the annular recess having transverse extensions aligned past the central core so that an overall recessed form like an omega "Ω" is defined thereby, the transverse extensions respectively providing inlet and outlet channels for said at least one optical fiber passing into the recess to go around the core and out from said base element; and
    a lid firmly attachable to said base to cover the overall omega-shaped recessed form while squeezing said ducts one each within said transverse extensions thereof to immobilize the same with respect to the base and the lid, whereby said at least one optical fiber entering one of said transverse extensions through said immobilized corresponding tubular duct can be disposed bare in a predetermined length around said core and leaves the other of said transverse extensions through the other of said corresponding protective ducts immobilized thereat.

2. The device as claimed in claim 1, wherein:
    at least one of said inlet and outlet channels has a rectangular section for receiving said tubular ducts therein aligned side by side.

3. The device as claimed in claim 1, wherein:
    at least one of said inlet and outlet channels has a semicircular section, a corresponding channel having the same circular section is formed in said lid and a barrel is provided having grooves in which said tubular ducts are disposed, said barrel being disposed in said two semicircular section channels.

4. The device as claimed in claim 1, wherein:
    said core includes a substantially cylindrical central part integral with said at least one case, surrounded by a removable ring intended to be removed after coiling of said optical fiber about said core.

5. The device as claimed in claim 2, wherein:
    said core includes a substantially cylindrical central part integral with said case, surrounded by a removable ring intended to be removed after coiling of said at least one optical fiber.

6. The device as claimed in claim 3, wherein:
    said core includes a substantially cylindrical central part integral with said case, surrounded by a removable ring intended to be removed after coiling of said at least one optical fiber.

* * * * *